United States Patent
Shen et al.

(10) Patent No.: US 12,028,866 B2
(45) Date of Patent: Jul. 2, 2024

(54) PDCCH MONITORING METHOD AND APPARATUS, TERMINAL, BASE STATION, AND STORAGE MEDIUM

(71) Applicant: VIVO MOBILE COMMUNICATION CO., LTD., Guangdong (CN)

(72) Inventors: Xiaodong Shen, Dongguan (CN); Xueming Pan, Dongguan (CN); Lei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 344 days.

(21) Appl. No.: 17/370,189

(22) Filed: Jul. 8, 2021

(65) Prior Publication Data
US 2021/0337523 A1    Oct. 28, 2021

Related U.S. Application Data

(63) Continuation of application No. PCT/CN2020/070877, filed on Jan. 8, 2020.

(30) Foreign Application Priority Data

Jan. 11, 2019 (CN) .......................... 201910028818.7

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......................... H04W 72/23; H04W 72/0446

USPC .......................................................... 370/329
See application file for complete search history.

(56) References Cited

U.S. PATENT DOCUMENTS

| | | | |
|---|---|---|---|
| 2018/0220400 A1* | 8/2018 | Nogami | H04W 76/27 |
| 2018/0227934 A1 | 8/2018 | Yang et al. | |
| 2018/0279289 A1* | 9/2018 | Islam | H04W 72/0446 |
| 2018/0279304 A1 | 9/2018 | Lee et al. | |
| 2018/0324689 A1 | 11/2018 | Li et al. | |
| 2019/0268902 A1* | 8/2019 | Sun | H04W 72/0446 |
| 2019/0349180 A1* | 11/2019 | Lu | H04L 27/2607 |
| 2020/0037354 A1* | 1/2020 | Li | H04W 74/0808 |
| 2020/0045696 A1* | 2/2020 | Huang | H04L 5/10 |

(Continued)

FOREIGN PATENT DOCUMENTS

| | | |
|---|---|---|
| CN | 108702693 A | 10/2018 |
| CN | 108811093 A | 11/2018 |

(Continued)

OTHER PUBLICATIONS

First Office Action regarding Chinese Patent Application No. 201910028818.7, dated Nov. 29, 2021. Translation provided by Bohui Intellectual Property.

(Continued)

*Primary Examiner* — Mark G. Pannell
(74) *Attorney, Agent, or Firm* — Harness, Dickey & Pierce, P.L.C.

(57) ABSTRACT

A PDCCH monitoring method includes: receiving GC-PDCCH information, the GC-PDCCH information including first indication information, and the first indication information being used to indicate a time domain location for PDCCH monitoring; and performing the PDCCH monitoring based on the time domain location indicated by the first indication information.

20 Claims, 4 Drawing Sheets

Receive GC-PDCCH information, where the GC-PDCCH information includes first indication information, and the first indication information is used to indicate a time domain location for PDCCH monitoring — S101

Perform the PDCCH monitoring based on the time domain location indicated by the first indication information — S102

(56) References Cited

U.S. PATENT DOCUMENTS

| | | | |
|---|---|---|---|
| 2020/0053782 A1* | 2/2020 | Zhang | H04L 5/0053 |
| 2020/0059910 A1 | 2/2020 | Wang et al. | |
| 2020/0092880 A1 | 3/2020 | Choi et al. | |
| 2020/0092913 A1* | 3/2020 | Xu | H04W 72/0446 |
| 2020/0137737 A1* | 4/2020 | Jo | H04L 5/001 |
| 2020/0177341 A1 | 6/2020 | Li et al. | |
| 2020/0322932 A1* | 10/2020 | Kim | H04B 7/0695 |
| 2020/0344759 A1* | 10/2020 | Zheng | H04W 72/20 |
| 2021/0076418 A1* | 3/2021 | Schober | H04L 5/0091 |
| 2021/0168866 A1 | 6/2021 | Li | |
| 2021/0219187 A1* | 7/2021 | Lee | H04W 4/40 |
| 2021/0243758 A1* | 8/2021 | Ji | H04L 5/0044 |
| 2021/0344451 A1* | 11/2021 | Hedayat | H04L 1/1861 |
| 2021/0367743 A1* | 11/2021 | Kim | H04L 5/0098 |
| 2021/0377936 A1* | 12/2021 | Yuan | H04W 72/27 |
| 2021/0392684 A1* | 12/2021 | Tiirola | H04W 72/0453 |
| 2022/0060305 A1* | 2/2022 | Ijaz | H04L 5/0082 |
| 2022/0110136 A1* | 4/2022 | Li | H04B 17/345 |
| 2022/0131652 A1* | 4/2022 | Bae | H04L 1/1854 |

FOREIGN PATENT DOCUMENTS

| | | |
|---|---|---|
| CN | 108811120 A | 11/2018 |
| CN | 109156014 A | 1/2019 |
| WO | WO-2018174692 A1 | 9/2018 |
| WO | WO-2018201840 A1 | 11/2018 |

OTHER PUBLICATIONS

"DL Common Control for NR," ZTE Microelectronics, 3GPP TSG RAN WG1 Meeting #88bis, R1-1704370, dated Apr. 7, 2017.
Supplementary European Search Report regarding Patent Application No. 20738009.8-1205/3911070; PCT/CN2020/070877, dated Feb. 18, 2022.
International Search Report and Written Opinion of the International Searching Authority regarding International Patent Application No. PCT/CN2020/070877, dated Mar. 25, 2020. Translation provided by Bohui Intellectual Property.

* cited by examiner

PDCCH MONITORING METHOD AND APPARATUS, TERMINAL, BASE STATION, AND STORAGE MEDIUM

CROSS-REFERENCE TO RELATED APPLICATIONS

This application is a Bypass Continuation Application of PCT/CN2020/070877 filed on Jan. 8, 2020, which claims priority to Chinese Patent Application No. 201910028818.7, filed on Jan. 11, 2019, which are incorporated herein by reference in their entirety.

TECHNICAL FIELD

Embodiments of the present disclosure relate to the communications field, and in particular, to a PDCCH monitoring method and apparatus, a terminal, a base station, and a computer-readable storage medium.

BACKGROUND

When a communications system of a fourth-generation mobile communications technology (4th Generation, 4G)/fifth-generation mobile communications technology (5th Generation, 5G) runs on an unlicensed frequency band (unlicensed spectrum), before sending information, a terminal or a network device needs to perform clear channel assess (CCA)/extended clear channel assess (eCCA) to monitor a channel. Energy detection (ED) is performed when the channel is being monitored. When energy is less than a specified threshold, the channel is determined as an idle channel, so that transmission can be started.

SUMMARY

According to a first aspect, some embodiments of the present disclosure provide a PDCCH monitoring method. The method is applied to a terminal side and includes:
receiving group common physical downlink control channel (GC-PDCCH) information, where the GC-PDCCH information includes first indication information, and the first indication information is used to indicate a time domain location for PDCCH monitoring; and
performing the PDCCH monitoring based on the time domain location indicated by the first indication information.

According to a second aspect, some embodiments of the present disclosure provide a PDCCH monitoring method. The method is applied to a base station side and includes:
sending GC-PDCCH information, where the GC-PDCCH information includes first indication information, and the first indication information is used to indicate a time domain location for PDCCH monitoring.

According to a first aspect, some embodiments of the present disclosure provide a PDCCH monitoring apparatus. The apparatus is applied to a terminal side and includes:
an information receiving module, configured to receive GC-PDCCH information, where the GC-PDCCH information includes first indication information, and the first indication information is used to indicate a time domain location for PDCCH monitoring; and
a monitoring module, configured to perform the PDCCH monitoring based on the time domain location indicated by the first indication information.

According to a fourth aspect, some embodiments of the present disclosure provide a PDCCH monitoring apparatus. The apparatus is applied to a base station side and includes:
an information sending module, configured to send GC-PDCCH information, where the GC-PDCCH information includes first indication information, and the first indication information is used to indicate a time domain location for PDCCH monitoring.

According to a fifth aspect, some embodiments of the present disclosure provide a terminal, including a processor, a memory, and a program that is stored in the memory and executable on the processor, where when the processor executes the program, the steps of the PDCCH monitoring method are implemented.

According to a sixth aspect, some embodiments of the present disclosure provide a base station, including a processor, a memory, and a program that is stored in the memory and executable on the processor, where when the processor executes the program, the steps of the PDCCH monitoring method are implemented.

According to a seventh aspect, some embodiments of the present disclosure provide a non-transitory computer-readable storage medium. The non-transitory computer-readable storage medium stores a computer program, and when a processor executes the computer program, the steps of the PDCCH monitoring method are implemented.

BRIEF DESCRIPTION OF DRAWINGS

It may be better understood from the following descriptions of specific implementations of the present disclosure with reference to the accompanying drawings that same or similar reference numerals represent same or similar features in the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

It should be noted that "A and/or B" includes the following three combinations: only A, only B, and a combination of A and B.

In a scheduling-based synchronous communications system, a receiving location of downlink data of the terminal depends on its downlink control channel configuration.

However, because the unlicensed frequency band is shared by a plurality of technologies or a plurality of transmission nodes, this contention-based access manner leads to uncertainty of a channel availability time.

A base station needs to configure a search space of PDCCH detection for each connected terminal. The terminal performs PDCCH blind detection on a specific time-frequency resource block based on a specific period in the configured search space.

Because of uncertainty of obtaining a channel on an unlicensed frequency band, a Wi-Fi system running on the unlicensed frequency band can preempt the channel at a granularity of microseconds as an asynchronous system. Therefore, the base station needs to configure high-frequency PDCCH monitoring for the terminal, so that the base station can send data to the terminal in time after obtaining the channel. However, high-frequency PDCCH monitoring may consume a large amount of power of the terminal.

Figure 1:
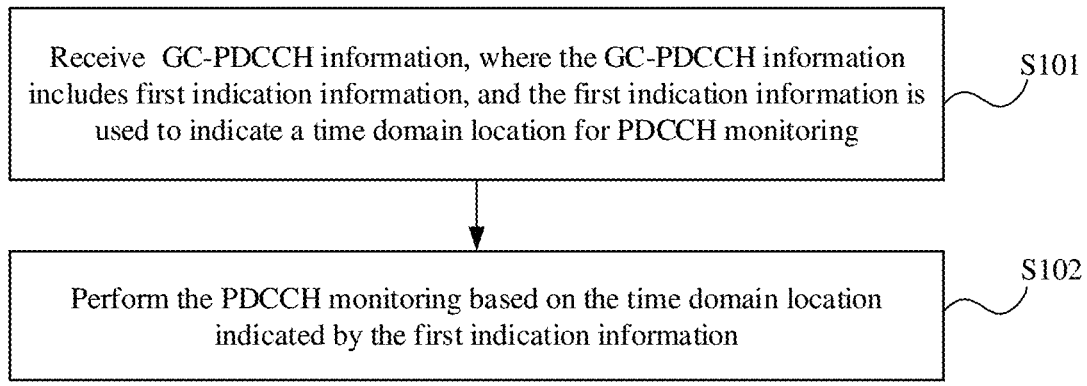
FIG. 1 is a schematic flowchart of a PDCCH monitoring method according to an embodiment of the present disclosure.

FIG. 1 is a schematic flowchart of a PDCCH monitoring method according to an embodiment of the present disclosure. The method is applied to a terminal side, and the method includes:

S101. Receive GC-PDCCH information, where the GC-PDCCH information includes first indication information, and the first indication information is used to indicate a time domain location for PDCCH monitoring.

In an example, the GC-PDCCH information includes at least one piece of monitoring information of user equipment (UE) specific PDCCH monitoring, and a single piece of monitoring information includes at least one to-be-monitored slot and a to-be-monitored symbol location in each slot.

S102: Perform the PDCCH monitoring based on the time domain location indicated by the first indication information.

In an example, S102 includes: performing the PDCCH monitoring based on the time domain location indicated by the first indication information and a preconfigured time domain location.

Figure 2:
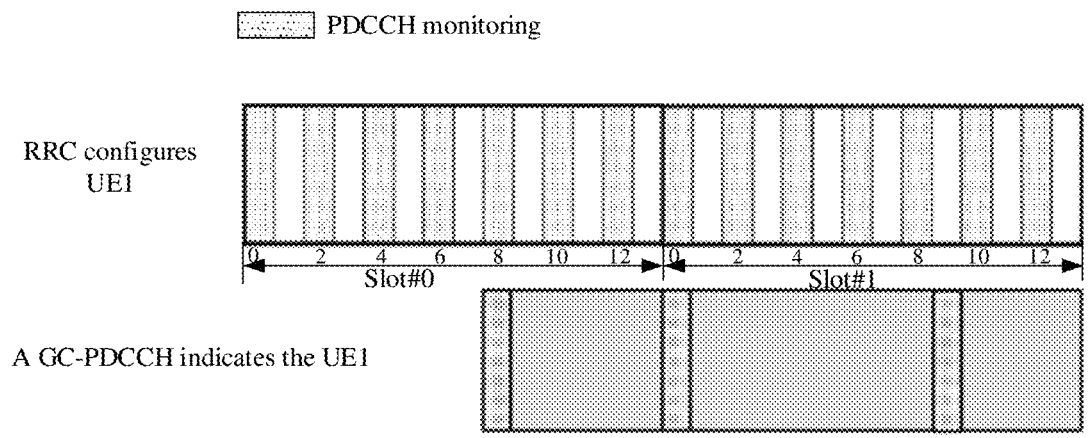
FIG. 2 is a schematic principle diagram of a PDCCH monitoring method according to another embodiment of the present disclosure.
Figure 2:
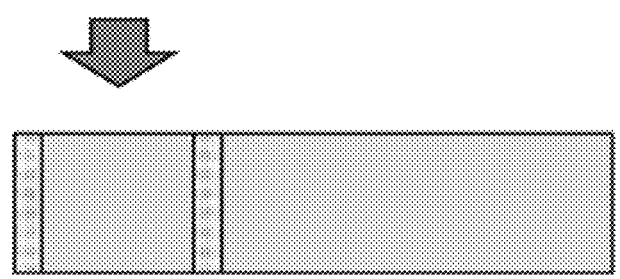

For example, an intersection of the time domain location indicated by the first indication information and the preconfigured time domain location is obtained, and PDCCH monitoring is performed based on a time domain location obtained from the intersection. As shown in FIG. 2, radio resource control (RRC) configures UE1 to perform PDCCH monitoring every two symbols, that is, is configured to perform PDCCH monitoring at a symbol location with an even number in slot #0, 1. The GC-PDCCH information indicates that the UE1 performs PDCCH monitoring at the symbol location 8 in the slot #0, the symbol location 0 in the slot #1, and the symbol location 9 in the slot #1. An intersection of a symbol location for PDCCH monitoring configured by the RRC and a symbol location for PDCCH monitoring indicated by the GC-PDCCH information is obtained, that is, the symbol location 8 in the slot #0 and the symbol location 0 in the slot #1. PDCCH monitoring is performed at the symbol location 8 in the slot #0 and the symbol location 0 in the slot #1.

PDCCH monitoring includes UE specific PDCCH monitoring and GC-PDCCH monitoring. During the UE specific PDCCH monitoring, monitoring is performed in a search space of a configured UE specific PDCCH.

In some embodiments of the present disclosure, because the time domain location indicated by the GC-PDCCH information is relatively sparse, a frequency of PDCCH monitoring is relatively low, thereby reducing power consumption of the terminal.

In some examples, if the intersection of the indicated time domain location for PDCCH monitoring and the preconfigured time domain location for PDCCH monitoring is obtained, PDCCH monitoring is performed in the intersection. Therefore, only when UE specific PDCCH monitoring is preconfigured at the time domain location, and the GC-PDCCH information also indicates that UE specific PDCCH monitoring is performed at the time domain location, the terminal can perform UE specific PDCCH monitoring at the time domain location, thereby reducing a quantity of PDCCH monitoring times performed by UE that is invoked and UE that is not invoked while ensuring data transmission performance, and reducing a PDCCH monitoring frequency.

In an embodiment of the present disclosure, a base station configures a search space of a GC-PDCCH for the terminal. When configuring the search space of the GC-PDCCH for the terminal, the base station configures whether the terminal can use the GC-PDCCH to trigger UE specific PDCCH monitoring. There are three manners of triggering UE specific PDCCH monitoring.

Manner 1

In a case where the search space is presumed in a protocol or the base station configures the search space for the terminal: if PDCCH monitoring specific to all terminals is triggered when the GC-PDCCH is detected, PDCCH monitoring specific to all terminals is stopped, and GC-PDCCH monitoring is performed when PDCCH monitoring specific to all terminals is stopped. If the GC-PDCCH is detected, PDCCH monitoring specific to all terminals is resumed.

The terminal performs blind detection on downlink control information (DCI) based on a search period and a search location of the search space of the GC-PDCCH.

In addition, it may be determined, by detecting demodulation reference signals (DM-RS) in the GC-PDCCH, whether the GC-PDCCH information is sent. If the DM-RS is detected, it indicates that the GC-PDCCH information is sent. If the DM-RS is not detected, it indicates that the GC-PDCCH information is not sent.

Manner 2

In a case where the search space is presumed in a protocol or the base station configures the search space for the terminal: If PDCCH monitoring specific to partial terminals is triggered when the GC-PDCCH is detected, PDCCH monitoring specific to partial terminals is stopped, PDCCH monitoring specific to a terminal other than the partial terminals is maintained, and GC-PDCCH monitoring is performed when PDCCH monitoring specific to partial terminals is stopped. If the GC-PDCCH is detected, PDCCH monitoring specific to partial terminals is resumed.

Manner 3

In a case where the search space is presumed in a protocol or the base station configures the search space for the terminal: If PDCCH monitoring specific to all or partial terminals is not triggered when the GC-PDCCH is detected, UE specific PDCCH monitoring and GC-PDCCH monitoring are simultaneously performed.

For example, when the terminal is configured to trigger PDCCH monitoring specific to one or more terminals by using the GC-PDCCH, and an identifier (ID) of a PDCCH search space specific to the one or more terminals is indicated, that is, the field is not 0, the terminal stops the PDCCH monitoring specific to the one or more terminals, performs normal UE specific PDCCH monitoring other than the PDCCH monitoring specific to the one or more terminals, and performs normal GC-PDCCH monitoring.

When the terminal is configured not to use the GC-PDCCH to trigger PDCCH monitoring specific to any terminal, that is, a field of an ID of a UE specific PDCCH search space is 0, the terminal performs both GC-PDCCH monitoring and UE specific PDCCH monitoring.

In an embodiment of the present disclosure, the GC-PDCCH information further includes second indication information, and the second indication information is used to indicate whether data was transmitted before a moment of sending the GC-PDCCH information.

If data was transmitted before the moment of sending the GC-PDCCH information, the PDCCH monitoring method further includes:

performing PDCCH monitoring in data cached before a moment of receiving the GC-PDCCH information.

In some examples, if the GC-PDCCH information further includes a data transmission start moment, the PDCCH monitoring method further includes:

performing PDCCH monitoring in data cached after the data transmission start moment and before a moment of receiving the GC-PDCCH information.

In an embodiment of the present disclosure, if the above PDCCH monitoring includes UE specific PDCCH monitoring, the GC-PDCCH information includes at least one piece of monitoring information of UE specific PDCCH monitoring, and a single piece of monitoring information includes one or a combination of the following: a monitoring start moment, a monitoring end moment, at least one to-be-monitored slot, and a to-be-monitored symbol location in each slot.

The single piece of monitoring information indicates slots in which PDCCH monitoring needs to be performed and symbol locations in a slot at which PDCCH monitoring needs to be performed.

The at least one piece of monitoring information includes first monitoring information, and to-be-monitored symbol locations in all of the at least one to-be-monitored slot in the first monitoring information are the same. It is uniformly indicated that one type of monitoring information is applied to all to-be-monitored slots. For example, slots #1, 2, 3, and 4 need to be monitored, and it is uniformly indicated that PDCCH monitoring is performed on symbols 0 in the slots #1, 2, 3, and 4.

Alternatively, the at least one piece of monitoring information includes first monitoring information and second monitoring information, and at least one to-be-monitored slot in the first monitoring information is different from at least one to-be-monitored slot in the second monitoring information. A to-be-monitored symbol location corresponding to the at least one to-be-monitored slot in the first monitoring information is the same as or different from a to-be-monitored symbol location corresponding to the at least one to-be-monitored slot in the second monitoring information. A plurality of types of monitoring information are applied to different slots. For example, slots #1, 2, 3, and 4 need to be monitored, and it is indicated that PDCCH monitoring is performed on a symbol 8 in the slot #1, and PDCCH monitoring is performed on symbols 0 in slots #2, 3, and 4.

If the monitoring information includes a monitoring start moment and/or a monitoring end moment, but does not include at least one to-be-monitored slot and a to-be-monitored symbol location in each slot, UE specific PDCCH monitoring is performed based on a preconfigured time domain location. That is, for a to-be-monitored time period, if the time period does not correspond to the at least one to-be-monitored slot or the to-be-monitored symbol location in each slot, UE specific PDCCH monitoring is performed based on a preconfigured monitoring slot and the to-be-monitored symbol location in each slot.

It should be noted that the monitoring information may include a monitoring start moment but does not include a monitoring end moment; or the monitoring information may include a monitoring end moment but does not include a monitoring start moment.

For example, the monitoring information is configured with a monitoring start moment and a monitoring end moment, the monitoring start moment and the monitoring end moment form a time period, and the time period is divided into two time periods by GC-PDCCH monitoring. For one of the time periods, the monitoring information includes a monitoring start moment but does not include a monitoring end moment. For another time period, the monitoring information includes a monitoring end moment but does not include a monitoring start moment.

If data was transmitted before the moment of sending the GC-PDCCH information, GC-PDCCH monitoring is performed in two manners.

Manner 1

1. UE specific PDCCH monitoring is performed based on a preconfigured time domain location in the data cached before the moment of sending the GC-PDCCH information. The preconfigured time domain location is a preconfigured time domain location used to perform PDCCH monitoring.

In some examples, if the GC-PDCCH information further includes a data transmission start moment, UE specific PDCCH monitoring is performed based on the preconfigured time domain location in data cached after the data transmission start moment and before the sending moment.

2. UE specific PDCCH monitoring is performed based on a time domain location in an intersection in data cached after the sending moment and data cached within a configured time period. A start moment of the configured time period is after the sending moment.

Manner 2

1. UE specific PDCCH monitoring is performed based on an intersection of a preconfigured time domain location and the time domain location indicated by the first indication information in data cached before the moment of sending the GC-PDCCH information.

The GC-PDCCH information includes a first time period, and an end moment of the first time period is before the sending moment. UE specific PDCCH monitoring is performed based on a time domain location in the intersection in data cached within the first time period.

2. UE specific PDCCH monitoring is performed based on an intersection of a preconfigured time domain location and the time domain location indicated by the first indication information in data cached after the moment of sending the GC-PDCCH information.

The GC-PDCCH information further includes a second time period, and a start moment of the second time period is after the sending moment. UE specific PDCCH monitoring is performed based on a time domain location in the intersection in data cached within the second time period.

A difference between the implementation 2 and the implementation 1 lies in that in the implementation 2, the intersection of the preconfigured time domain location before the sending moment and the time domain location indicated by the first indication information is obtained, so that a PDCCH monitoring frequency is reduced without scheduling data.

If PDCCH monitoring includes GC-PDCCH monitoring, the GC-PDCCH information further includes monitoring information of GC-PDCCH monitoring, and the monitoring information includes one or a combination of the following:

a monitoring start moment, a monitoring end moment, at least one to-be-monitored slot, and a to-be-monitored symbol location in each slot.

GC-PDCCH monitoring is performed based on a search space of a GC-PDCCH.

GC-PDCCH monitoring may be performed based on the monitoring information, or the monitoring information is dynamically changed automatically, and GC-PDCCH monitoring is performed based on the dynamically changed monitoring information, and GC-PDCCH monitoring ends at the monitoring end moment.

If the GC-PDCCH information indicates an end moment of GC-PDCCH monitoring, and PDCCH monitoring is performed at the end moment, continuous monitoring is avoided, that is, monitoring is performed when PDCCH monitoring is required, thereby avoiding unnecessary PDCCH monitoring and reducing a quantity of PDCCH monitoring times, to reduce power consumption of the terminal.

If data was transmitted before the moment of sending the GC-PDCCH information, and the GC-PDCCH information further includes a data transmission end moment, the end moment of GC-PDCCH monitoring is the data transmission end moment or a moment before the data transmission end moment.

If the GC-PDCCH information further includes uplink and downlink configurations of at least one slot in a channel occupancy time (COT).

When an identifier of a slot is a first predetermined identifier, all symbols in the slot are downlink; when an identifier of a slot is a second predetermined identifier, all symbols in the slot are uplink; or when an identifier of a slot is a third predetermined identifier, all symbols in the slot are uplink and downlink. For example, D indicates that all symbols in a slot are downlink, U indicates that all symbols in a slot are uplink, and H indicates that symbols in a slot are uplink and downlink.

The PDCCH monitoring method further includes:
  skipping performing UE specific PDCCH monitoring and GC-PDCCH monitoring for a slot in which all symbols in the COT are uplink. For example, the terminal does not perform UE specific PDCCH monitoring or GC-PDCCH monitoring in a U slot in which all symbols are uplink.

When UE specific PDCCH monitoring is performed and scheduling data is decoded, if a UE specific PDCCH is monitored, rate matching is performed on the scheduling data based on an indication of downlink control information DCI or a detected GC-PDCCH.

In an embodiment of the present disclosure, the GC-PDCCH information further includes information used to indicate whether semi-static grant resources share a COT. The PDCCH monitoring method further includes:
  If it is indicated that the semi-static grant resources share the COT, fixed listen before talk (Cat2 Listen Before Talk, Cat2 LBT) is performed before the semi-static grant resources. If it is indicated that the semi-static grant resources do not share the COT, random back-off listen before talk (Cat4 Listen Before Talk, Cat4 LBT) is performed before the semi-static grant resources.

That is, if the terminal receives an indication indicating that the configured semi-static grant resources can share the COT, short-term channel monitoring is performed before the configured semi-static grant resources, that is, Cat2 LBT is performed; or if the terminal receives an indication indicating that the configured semi-static grant resources cannot share the COT, long-term channel monitoring is performed before the configured semi-static grant resources, that is, Cat4 LBT is performed.

An embodiment of the present disclosure provides a PDCCH monitoring method. The method is applied to a base station side, and the method includes:
  sending GC-PDCCH information, where the GC-PDCCH information includes first indication information, and the first indication information is used to indicate a time domain location for PDCCH monitoring.

It should be noted that the GC-PDCCH information is sent to a terminal, and PDCCH monitoring includes UE specific PDCCH monitoring and/or GC-PDCCH monitoring.

The time domain location for PDCCH monitoring indicated by the first indication information is used to obtain an intersection with a preconfigured time domain location for PDCCH monitoring, so that the terminal performs PDCCH monitoring at a time domain location in the intersection.

The time domain location for PDCCH monitoring indicated by the first indication information includes:
  at least one slot for PDCCH monitoring and a symbol location for PDCCH monitoring in each slot. That is, the first indication information indicates slots in which PDCCH monitoring needs to be performed and symbol locations in a slot at which PDCCH monitoring needs to be performed.

In some embodiments of the present disclosure, because the time domain location indicated by the GC-PDCCH information is relatively sparse, a frequency of PDCCH monitoring is relatively low, thereby reducing power consumption of the terminal.

In an embodiment of the present disclosure, the GC-PDCCH information further includes one or a combination of the following information:
  1. Information used to indicate whether data was transmitted by the terminal before a moment of sending the GC-PDCCH information.
  2. A moment at which the terminal starts to perform data transmission, where the start moment is a moment in a COT.
  3. A moment at which the terminal ends data transmission, where the end moment is a moment in the COT.
  4. Information indicating UE specific PDCCH monitoring.
    (1) It indicates an effective start time of UE specific PDCCH monitoring information (a start time of reusable data transmission). It should be noted that the start time may be before a GC-PDCCH.
    (2) It indicates an effective end time of UE specific PDCCH monitoring information (an end time of reusable data transmission).
    (3) It indicates slots in which PDCCH monitoring needs to be performed.
    (4) It indicates symbol locations in a slot at which PDCCH monitoring needs to be performed.

Optionally, it is uniformly indicated that one type of monitoring information is applied to all to-be-monitored slots.

Optionally, a plurality of types of monitoring information are applied to different slots.

It should be noted that there may be one or more pieces of UE specific PDCCH monitoring information.

If a single piece of monitoring information does not indicate slots in which PDCCH monitoring needs to be performed or symbol locations in a slot at which PDCCH monitoring needs to be performed, UE specific PDCCH monitoring is performed based on a preconfigured time domain location.

If a single piece of monitoring information indicates slots in which PDCCH monitoring needs to be performed and/or symbol locations in a slot at which PDCCH monitoring needs to be performed, UE specific PDCCH monitoring is performed by obtaining an intersection of a time domain location indicated by the monitoring information and a preconfigured time domain location.

5. Uplink-downlink configurations indicating a plurality of slots in a channel occupancy time, where D indicates that all symbols in the slot are downlink, U indicates that all symbols in the slot are uplink, and H indicates that symbols in the slot are uplink and downlink.

6. Information indicating GC-PDCCH monitoring.

(1) It indicates a moment at which GC-PDCCH monitoring is stopped. The moment at which GC-PDCCH monitoring is stopped may be a moment before a data transmission end moment, or the moment at which GC-PDCCH monitoring is stopped may be a data transmission end moment.

(2) It indicates slots in which GC-PDCCH needs to be performed.

7. Information used to indicate whether semi-static grant resources share a COT.

(1) It indicates that the semi-static grant resources perform sharing before a channel occupancy end moment.

(2) It indicates which semi-static grant resources can share the COT.

In an embodiment of the present invention, the PDCCH monitoring method further includes:

configuring a search space of a GC-PDCCH, where information configured when the search space is configured includes one or a combination of the following: a search period, a search location, a new DCI format scrambled by a detected new RNTI (such as a Power Saving-RNTI), an aggregation level, and a quantity of blind detections.

It should be noted that the search space of the GC-PDCCH may be configured before the GC-PDCCH information is sent.

When the search space of the GC-PDCCH is being configured, whether to use the GC-PDCCH to trigger UE specific PDCCH monitoring is further configured.

For example, if the terminal is configured to trigger UE specific PDCCH monitoring by using the GC-PDCCH, the terminal stops PDCCH monitoring specific to at least one terminal, and performs GC-PDCCH monitoring when PDCCH monitoring specific to the at least one terminal is stopped. When the GC-PDCCH is detected, PDCCH monitoring specific to the at least one terminal is resumed.

For another example, if the terminal is configured not to trigger UE specific PDCCH monitoring by using the GC-PDCCH, the terminal performs the UE specific PDCCH monitoring and the GC-PDCCH monitoring simultaneously.

In an embodiment of the present disclosure, the PDCCH monitoring method further includes:

determining a moment of sending the GC-PDCCH information based on whether to trigger UE specific PDCCH monitoring by using a GC-PDCCH.

If it is configured that UE specific PDCCH monitoring is not triggered by using the GC-PDCCH, the sending time is freely selected as required.

If it is configured that UE specific PDCCH monitoring is triggered through GC-PDCCH monitoring, the sending moment of the GC-PDCCH information includes: the first sending location after the channel is obtained or the first sending location at which the terminal enters a discontinuous reception state (Discontinuous Reception on, DRX on), and the sending location is a symbol location used to send the GC-PDCCH information in a configured slot.

For example, if it is configured that the GC-PDCCH information is sent on a symbol 12 in a slot, and the base station obtains the channel in a symbol 3 in the slot, the GC-PDCCH information is sent when the symbol 12 arrives for the first time.

For another example, if it is configured that the GC-PDCCH information is sent on a symbol 0 in a slot, and on a symbol 5, the terminal enters the discontinuous reception state DRX on, the GC-PDCCH information is sent when a symbol 0 in a next slot arrives.

The following describes the foregoing technical solution by using two embodiments.

Embodiment 1

Figure 3:
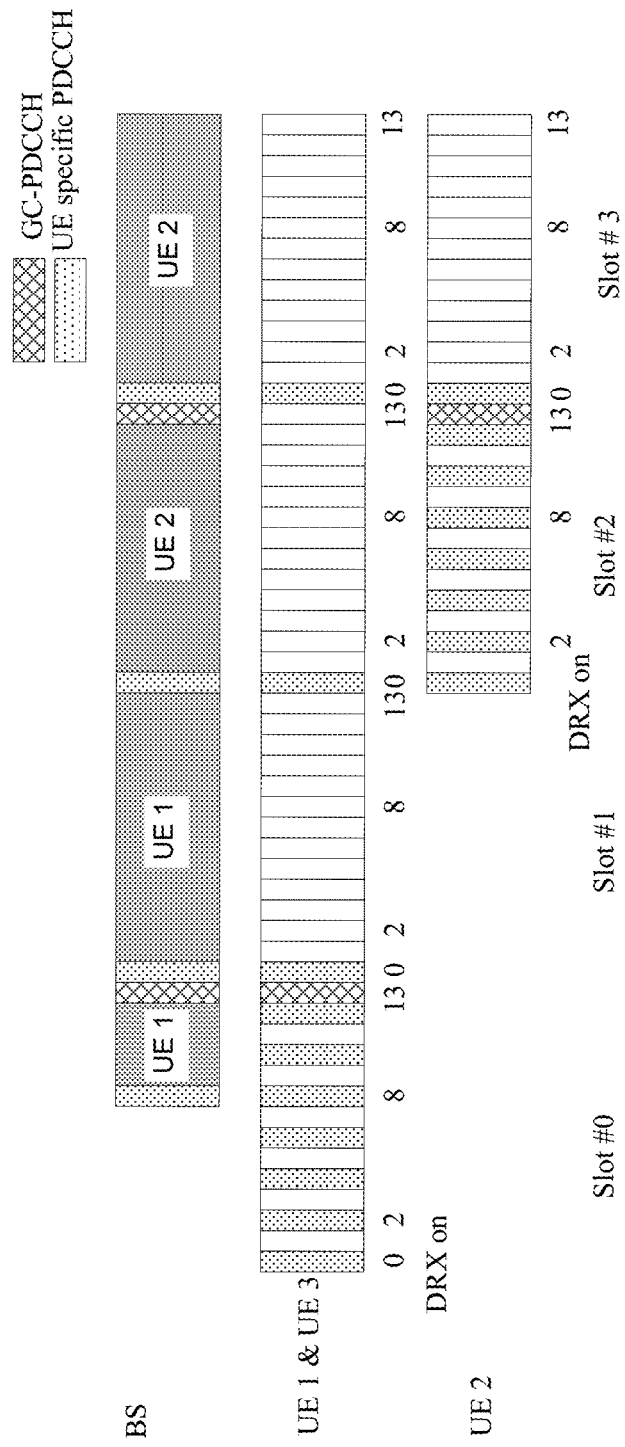
FIG. 3 is a schematic principle diagram of a PDCCH monitoring method according to still another embodiment of the present disclosure.

It is assumed that the base station configures the terminal to perform GC-PDCCH monitoring on the last symbol in each slot, and configures the terminal to trigger UE specific PDCCH monitoring when a GC-PDCCH is detected. In addition, the base station configures UE1, UE2 and UE3 to perform UE specific PDCCH monitoring every two symbols. Taking the UE1 as an example, as shown in FIG. 3, the UE1 is configured with a UE specific PDCCH monitoring period of every two symbols. The UE1, the UE2, and the UE3 perform DM-RS detection at a candidate blind detection location of a GC-PDCCH configured after DRX on, and the GC-PDCCH information is detected if it is determined that a DM-RS exists.

The base station BS obtains a channel on a symbol 8 in the slot #0 and schedules data of the UE1, and sends the GC-PDCCH information on a symbol 13. The GC-PDCCH information is sent at the first location that can be used to send the GC-PDCCH information after the channel is obtained. The GC-PDCCH information includes information used to indicate that data was transmitted before the GC-PDCCH information is sent. A format of UE specific PDCCH monitoring is changed to a symbol 0 in a slot after a slot (that is, the slot #0) in which the GC-PDCCH information is sent, and an effective time of UE specific PDCCH monitoring ends at the last symbol of the slot #3, that is, the format of UE specific PDCCH monitoring is changed to symbols 0 in the slot #1, the sot #2, and the slot #3.

On the symbol 0 in the slot #2, the UE2 is in DRX on, and the base station also needs to send the GC-PDCCH information to the UE2 for indication. Content of the GC-PDCCH information indicating the UE2 is consistent with that of the GC-PDCCH information indicating the UE1.

After receiving the GC-PDCCH information on the slot #0, the UE1 performs configured UE specific PDCCH monitoring in a current Slot. The UE1 detects and receives scheduling data. A preconfigured UE specific PDCCH format and a UE specific PDCCH format indicated by the GC-PDCCH information are combined in the slots #1, 2, and 3 to perform UE specific PDCCH monitoring.

For the slot #1, the preconfigured UE specific PDCCH monitoring format is: Blind detection is performed on a symbol 0, a symbol 2, a symbol 4, a symbol 6, a symbol 8, a symbol 10, and a symbol 12 in the slot #1. UE specific PDCCH monitoring format indicated by the GC-PDCCH information is: Blind detection is performed on the symbol 0 in the slot #1. If an intersection of the preconfigured UE specific PDCCH format and the UE specific PDCCH format indicated by the GC-PDCCH information, namely, the symbol 0 in the slot #1, is obtained, UE specific PDCCH monitoring is performed on the symbol 0 in the slot #1.

Therefore, the terminal performs UE specific PDCCH monitoring at a symbol location only when UE specific PDCCH monitoring is preconfigured at the symbol location and the GC-PDCCH information also indicates that UE specific PDCCH monitoring is performed at the symbol location. For the UE3, UE specific PDCCH monitoring mode is the same for the UE1 and the UE3.

Embodiment 2

Figure 4:
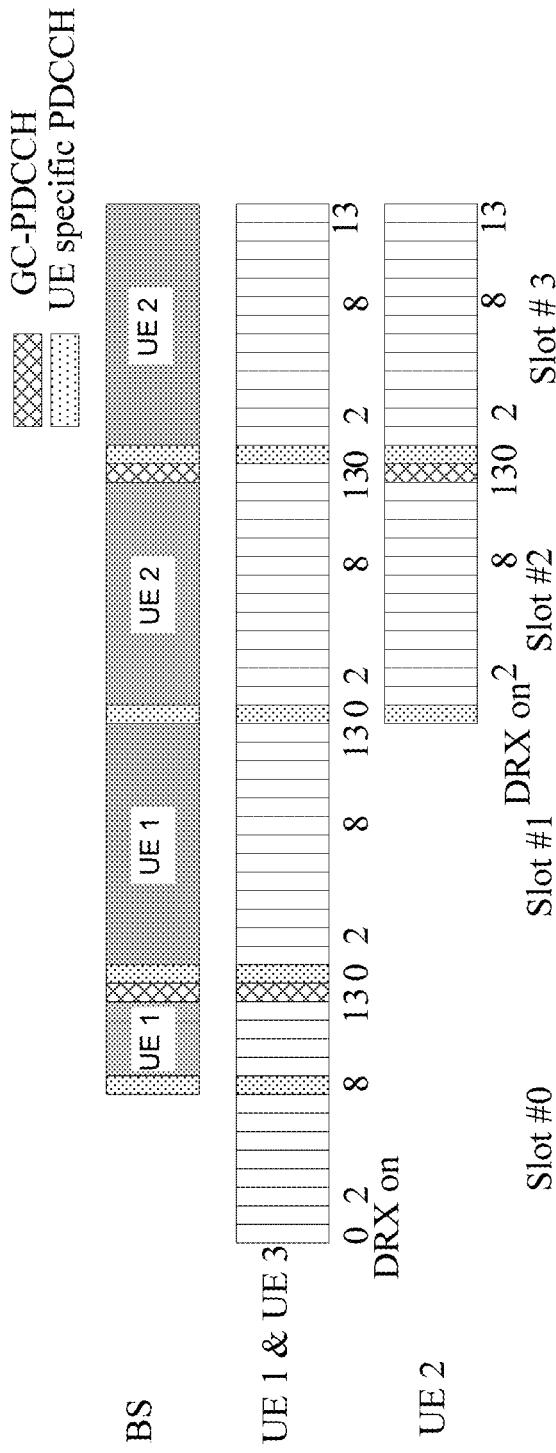
FIG. 4 is a schematic principle diagram of a PDCCH monitoring method according to yet another embodiment of the present disclosure.

It is assumed that the base station configures the terminal to perform GC-PDCCH monitoring on the last symbol in each slot, and configures the terminal to trigger UE specific PDCCH monitoring when a GC-PDCCH is detected. In addition, the base station configures UE1, UE2 and UE3 to perform UE specific PDCCH monitoring every two symbols. Taking the UE1 as an example, as shown in FIG. 4, the UE1 is configured with a PDCCH detection period of every two symbols, and after obtaining a channel, the BS performs PDCCH sending at a configured location to schedule sending of data of the UE1. Therefore, the UE1, the UE2, and the UE3 perform DM-RS detection at a candidate blind detection location of a GC-PDCCH configured after DRX on, and GC-PDCCH detection is performed if it is determined that a DM-RS exists.

The base station obtains a channel on a symbol 8 in the slot #0 and schedules data of the UE1, and sends the GC-PDCCH information on a symbol 13. The GC-PDCCH information indicates that UE specific PDCCH monitoring information in different slots is different, that is, UE specific PDCCH monitoring is performed on the symbol 8 in the slot #0, and UE specific PDCCH monitoring is performed on a symbol 0 in slots #1, 2, and 3. In the slot #2, because the UE2 is in DRX on in this case, a GC-PDCCH also needs to be sent to indicate that indicated content is consistent with the above content.

In the slots #0, 1, 2, and 3, a preconfigured UE specific PDCCH format and a format indicated by the GC-PDCCH are combined to perform UE specific PDCCH blind detection. That is, the terminal performs blind detection only when both the preconfiguration and the GC-PDCCH indicate that blind detection needs to be performed at a specific symbol location.

Corresponding to the PDCCH monitoring method provided in some embodiments of the present disclosure, some embodiments of the present disclosure provide a PDCCH monitoring apparatus. The apparatus is applied to a terminal side and includes an information receiving module, an intersection obtaining module, and a monitoring module.

The information receiving module is configured to receive GC-PDCCH information, where the GC-PDCCH information includes first indication information, and the first indication information is used to indicate a time domain location for PDCCH monitoring; and the monitoring module is configured to perform PDCCH monitoring based on the time domain location indicated by the first indication information.

Corresponding to the PDCCH monitoring method provided in some embodiments of the present disclosure, some embodiments of the present disclosure provide a PDCCH monitoring apparatus. The apparatus is applied to a base station side and includes:

an information sending module, configured to send GC-PDCCH information, where the GC-PDCCH information includes first indication information, and the first indication information is used to indicate a time domain location for PDCCH monitoring.

Figure 5:
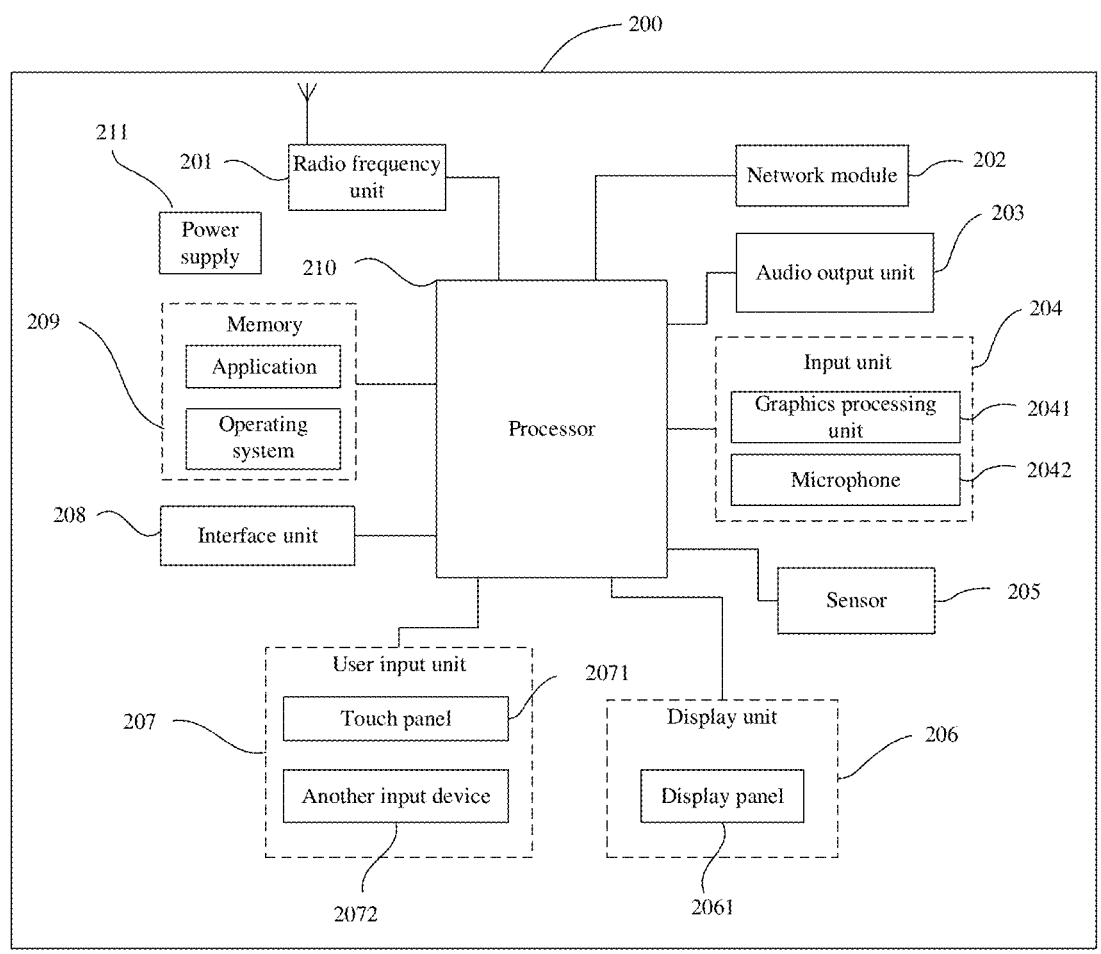
FIG. 5 is a schematic diagram of a hard structure of a terminal according to some embodiments of the present disclosure.

FIG. 5 is a schematic diagram of a hardware structure of a terminal according to some embodiments of the present disclosure.

As shown in FIG. 5, terminal 200 includes but is not limited to: a radio frequency unit 201, a network module 202, an audio output unit 203, an input unit 204, a sensor 205, a display unit 206, a user input unit 207, an interface unit 208, a memory 209, a processor 210, a power supply 211, and the like. A person skilled in the art may understand that the structure of the mobile terminal shown in FIG. 5 constitutes no limitation on the mobile terminal, and the mobile terminal may include more or fewer parts than those shown in the figure, or combine some parts, or have a different part arrangement. In some embodiments of the present disclosure, the mobile terminal includes but is not limited to a mobile phone, a tablet computer, a laptop computer, a palmtop computer, an in-vehicle terminal, a wearable device, a pedometer, and the like.

The radio frequency unit 201 is configured to receive GC-PDCCH information, where the GC-PDCCH information includes first indication information, and the first indication information is used to indicate a time domain location for PDCCH monitoring; and the processor 210 is configured to perform PDCCH monitoring based on the time domain location indicated by the first indication information.

In some embodiments of the present disclosure, PDCCH monitoring is performed based on the time domain location indicated by the GC-PDCCH information. Because the time domain location indicated by the GC-PDCCH information is relatively sparse, a frequency of PDCCH monitoring is relatively low, thereby reducing power consumption of the terminal.

It should be understood that, in some embodiments of the present disclosure, the radio frequency unit 201 may be configured to receive and send information or a signal in a call process. After receiving downlink data from a base station, the radio frequency unit 201 sends the downlink data to the processor 210 for processing. In addition, the radio frequency unit 201 sends uplink data to the base station. Usually, the radio frequency unit 201 includes but is not limited to an antenna, at least one amplifier, a transceiver, a coupler, a low noise amplifier, a duplexer, and the like. In addition, the radio frequency unit 201 may communicate with a network and another device through a wireless communication system.

The mobile terminal provides wireless broadband Internet access for the user by using the network module 202, for example, helping the user to send and receive an e-mail, browse a web page, and access streaming media.

The audio output unit 203 may convert audio data received by the radio frequency unit 201 or the network module 202 or stored in the memory 209 into an audio signal and output the audio signal as a sound. In addition, the audio output unit 203 may further provide an audio output (for example, a call signal received voice, or a message received voice) related to a specific function implemented by the terminal 200. The audio output unit 203 includes a loudspeaker, a buzzer, a telephone receiver, and the like.

The input unit 204 is configured to receive an audio signal or a video signal. The input unit 204 may include a graphics processing unit (GPU) 2041 and a microphone 2042, and the graphics processing unit 2041 processes image data of a still picture or a video obtained by an image capture apparatus (such as a camera) in a video capture mode or an image capture mode. The processed image frame may be displayed on the display unit 206. The image frame processed by the graphics processing unit 2041 may be stored in the memory 209 (or another storage medium) or sent by using the radio frequency unit 201 or the network module 202. The microphone 2042 may receive a sound and can process such sound into audio data. The processed audio data may be converted, in a call mode, into a format that can be sent to a mobile communication base station by using the radio frequency unit 201 for output.

The terminal 200 further includes at least one sensor 205, for example, a light sensor, a motion sensor, and another sensor. The light sensor includes an ambient light sensor and a proximity sensor, where the ambient light sensor can adjust brightness of a display panel 2061 based on brightness of ambient light, and the proximity sensor can turn off the display panel 2061 and/or backlight when the terminal 200 is moved towards an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 205 may further include a fingerprint sensor, a pressure sensor, an iris sensor, a molecular sensor, a gyroscope, a barometer, a hygrometer, a thermometer, an infrared sensor, and the like. Details are not described herein.

The display unit 206 is configured to display information entered by a user or information provided for a user. The display unit 206 may include a display panel 2061, and the display panel 2061 may be configured in a form of liquid crystal display (LCD), organic light-emitting diode (OLED), or the like.

The user input unit 207 may be configured to: receive digit or character information that is input, and generate key signal input related to user setting and function control of the mobile terminal. The user input unit 207 includes a touch panel 2071 and another input device 2072. The touch panel 2071 is also referred to as a touchscreen, and may collect a touch operation performed by a user on or near the touch panel 2071 (such as an operation performed by a user on the touch panel 2071 or near the touch panel 2071 by using any proper object or accessory, such as a finger or a stylus). The touch panel 2071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 210, and can receive and execute a command sent by the processor 210. In addition, the touch panel 2071 may be of a resistive type, a capacitive type, an infrared type, a surface acoustic wave type, or the like. The user input unit 207 may include another input device 2072 in addition to the touch panel 2071. The another input device 2072 may include but is not limited to a physical keyboard, a functional button (such as a volume control button or a power on/off button), a trackball, a mouse, and a joystick. Details are not described herein.

Optionally, the touch panel 2071 may cover the display panel 2061. When detecting the touch operation on or near the touch panel 2071, the touch panel 2071 transmits the touch operation to the processor 210 to determine a type of a touch event, and then the processor 210 provides corresponding visual output on the display panel 2061 based on the type of the touch event. In FIG. 5, the touch panel 2071 and the display panel 2061 are used as two independent components to implement input and output functions of the mobile terminal. However, in some embodiments, the touch panel 2071 and the display panel 2061 may be integrated to implement the input and output functions of the mobile terminal. This is not specifically limited herein.

The interface unit 208 is an interface for connecting an external apparatus with the terminal 200. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 208 may be configured to receive an input (for example, data information and power) from the external apparatus and transmit the received input to one or more elements in the terminal 200, or transmit data between the terminal 200 and the external apparatus.

The memory 209 may be configured to store software programs and various data. The memory 209 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 209 may include a high speed random access memory, and may further include a non-volatile memory, for example, at least one magnetic disk memory device, a flash memory device, or other volatile solid state memory devices.

The processor 210 is a control center of the mobile terminal, and is connected to all parts of the entire mobile terminal by using various interfaces and lines, and performs various functions of the mobile terminal and processes data by running or executing the software program and/or the module that are/is stored in the memory 209 and invoking the data stored in the memory 209, to implement overall monitoring on the mobile terminal. The processor 210 may include one or more processing units. Optionally, the processor 210 may integrate an application processor and a modem processor. The application processor mainly processes an operating system, a user interface, an application program, and the like. The modem processor mainly processes wireless communication. It can be understood that, alternatively, the modem processor may not be integrated into the processor 210.

The terminal 200 may further include the power supply 211 (such as a battery) that supplies power to each component. Optionally, the power supply 211 may be logically connected to the processor 210 by using a power management system, so as to implement functions such as charging, discharging, and power consumption management by using the power management system.

In addition, the terminal 200 includes some functional modules not shown. Details are not described herein.

Some embodiments of the present disclosure provide a terminal, including a processor, a memory, and a program that is stored in the memory and that can run on the processor, where when the processor executes the program, the steps of the foregoing PDCCH monitoring method are implemented.

Some embodiments of the present disclosure provide a base station, including a processor, a memory, and a program that is stored in the memory and that can run on the processor, where when the processor executes the program, the steps of the foregoing PDCCH monitoring method are implemented.

Some embodiments of the present disclosure provide a non-transitory computer-readable storage medium. The non-transitory computer-readable storage medium stores a computer program, and when a processor executes the computer program, the steps of the foregoing PDCCH monitoring method or the steps of the foregoing PDCCH monitoring method are implemented. The non-transitory computer-readable storage medium includes a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements, but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

In addition, it should be noted that in the apparatus and method of the present disclosure, it is obvious that the components or steps may be decomposed and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. A person of ordinary skill in the art can understand that all or any of the steps or components of the method and the apparatus in the present disclosure may be implemented in any computing apparatus (including a processor, a storage medium, and the like) or a network of a computing apparatus through hardware, firmware, software, or a combination thereof. This can be implemented by a person of ordinary skill in the art by using their basic programming skills when reading the descriptions of the present disclosure.

It can be understood that the embodiments described in the embodiments of the present disclosure may be implemented by hardware, software, firmware, middleware, microcode, or a combination thereof. For hardware implementation, a processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

Therefore, the objective of the present disclosure may also be implemented by running a program or a group of programs on any computing apparatus. The computing apparatus may be a well-known general-purpose apparatus. Therefore, the objective of the present disclosure may also be implemented by providing only a program product that includes program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, it is obvious that each component or step may be decomposed and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A physical downlink control channel (PDCCH) monitoring method, applied to a terminal side and comprising:
    receiving group common physical downlink control channel (GC-PDCCH) information, wherein the GC-PDCCH information comprises first indication information, and the first indication information is used to indicate a time domain location for PDCCH monitoring; and
    performing the PDCCH monitoring based on the time domain location indicated by the first indication information;
    wherein the performing the PDCCH monitoring based on the time domain location indicated by the first indication information comprises performing the PDCCH monitoring based on the time domain location indicated by the first indication information and a preconfigured time domain location.

2. The method according to claim 1, wherein
    an intersection of the time domain location indicated by the first indication information and the preconfigured time domain location is obtained, and the PDCCH monitoring is performed based on a time domain location obtained from the intersection.

3. The method according to claim 1, wherein the GC-PDCCH information further comprises second indication information, and the second indication information is used to indicate whether data was transmitted before a moment of sending the GC-PDCCH information.

4. The method according to claim 3, wherein if data was transmitted before the moment of sending the GC-PDCCH information, the PDCCH monitoring is performed in first cache data, and the first cache data is data cached before a moment of receiving the GC-PDCCH information.

5. The method according to claim 4, wherein the GC-PDCCH information further comprises a data transmission start moment, and the PDCCH monitoring is performed on data cached after the data transmission start moment in the first cache data; or
    the PDCCH monitoring is performed in the first cache data based on a preconfigured time domain location; or
    the PDCCH monitoring is performed in second cache data based on the time domain location indicated by the first indication information and the preconfigured time domain location, and the second cache data is data cached after the moment of receiving the GC-PDCCH information; or
    PDCCH monitoring is performed in the first cache data and second cache data based on the time domain location indicated by the first indication information and the preconfigured time domain location, and the second cache data is data cached after the moment of receiving the GC-PDCCH information.

6. The method according to claim 1, wherein the PDCCH monitoring comprises user equipment (UE) specific PDCCH monitoring;
    the GC-PDCCH information comprises at least one piece of monitoring information of UE specific PDCCH monitoring, and each piece of monitoring information comprises at least one to-be-monitored slot and a to-be-monitored symbol location in each slot.

7. The method according to claim 6, wherein the at least one piece of monitoring information comprises first monitoring information, and to-be-monitored symbol locations in all of the at least one slot in the first monitoring information are the same; or
    the at least one piece of monitoring information comprises first monitoring information and second monitoring information, and at least one to-be-monitored slot in the first monitoring information is different from at least one to-be-monitored slot in the second monitoring information.

8. The method according to claim 6, wherein the GC-PDCCH information comprises at least one piece of monitoring information of the UE specific PDCCH monitoring; and for a monitoring time period not indicated by the at least one piece of monitoring information, the UE specific PDCCH monitoring is performed based on the preconfigured time domain location.

9. The method according to claim 6, further comprising:
    if a UE specific PDCCH is detected, performing rate matching on scheduling data based on an indication of downlink control information (DCI) or a detected GC-PDCCH.

10. The method according to claim 9, further comprising:
    determining, by detecting demodulation reference signals (DM-RS) in a GC-PDCCH, whether the GC-PDCCH information is sent.

11. The method according to claim 6, further comprising:
    if the UE specific PDCCH monitoring is triggered through GC-PDCCH monitoring, stopping the UE specific PDCCH monitoring and performing the GC-PDCCH monitoring; or
    if UE specific PDCCH monitoring is not triggered through GC-PDCCH monitoring, performing the UE specific PDCCH monitoring and the GC-PDCCH monitoring simultaneously.

12. The method according to claim 1, wherein the PDCCH monitoring comprises GC-PDCCH monitoring;
the GC-PDCCH information further comprises monitoring information of the GC-PDCCH monitoring, and the monitoring information comprises one or a combination of: a monitoring start moment, a monitoring end moment, at least one to-be-monitored slot, and a to-be-monitored symbol location in each slot.

13. The method according to claim 12, wherein
the GC-PDCCH monitoring is performed based on the monitoring information or the GC-PDCCH monitoring is performed based on changed monitoring information.

14. The method according to claim 12, further comprising:
if a GC-PDCCH is detected, stopping the GC-PDCCH monitoring and resuming the GC-PDCCH monitoring when data transmission ends.

15. The method according to claim 1, wherein the GC-PDCCH information further comprises uplink-downlink configuration information of at least one slot in a channel occupancy time (COT); and
the method further comprises:
skipping performing user equipment (UE) specific PDCCH monitoring and GC-PDCCH monitoring for a slot in which all symbols in the COT are uplink.

16. The method according to claim 1, wherein the GC-PDCCH information further comprises information used to indicate whether semi-static grant resources share a channel occupancy time (COT); and the method further comprises:
if it is indicated that the semi-static grant resources share the channel occupancy time (COT), performing fixed listen before talk (Cat2 LBT) before the semi-static grant resources; or
if it is indicated that the semi-static grant resources do not share the COT, performing random back-off listen before talk (Cat4 LBT) before the semi-static grant resources.

17. A terminal, comprising a memory, a processor, and a program that is stored in the memory and executable on the processor, wherein the program, when executed by the processor, causes the terminal to perform the PDCCH monitoring method according to claim 1.

18. A physical downlink control channel (PDCCH) monitoring method, applied to a terminal side and comprising:
receiving group common physical downlink control channel (GC-PDCCH) information, wherein the GC-PDCCH information comprises first indication information, and the first indication information is used to indicate a time domain location for PDCCH monitoring; and
performing the PDCCH monitoring based on the time domain location indicated by the first indication information;
wherein the GC-PDCCH information further comprises second indication information, and the second indication information is used to indicate whether data was transmitted before a moment of sending the GC-PDCCH information.

19. The PDCCH monitoring method according to claim 18, wherein if data was transmitted before the moment of sending the GC-PDCCH information, the PDCCH monitoring is performed in first cache data, and the first cache data is data cached before a moment of receiving the GC-PDCCH information;
wherein the GC-PDCCH information further comprises a data transmission start moment, and the PDCCH monitoring is performed on data cached after the data transmission start moment in the first cache data; or
the PDCCH monitoring is performed in the first cache data based on a preconfigured time domain location; or
the PDCCH monitoring is performed in second cache data based on the time domain location indicated by the first indication information and the preconfigured time domain location, and the second cache data is data cached after the moment of receiving the GC-PDCCH information; or
PDCCH monitoring is performed in the first cache data and second cache data based on the time domain location indicated by the first indication information and the preconfigured time domain location, and the second cache data is data cached after the moment of receiving the GC-PDCCH information.

20. A physical downlink control channel (PDCCH) monitoring method, applied to a terminal side and comprising:
receiving group common physical downlink control channel (GC-PDCCH) information, wherein the GC-PDCCH information comprises first indication information, and the first indication information is used to indicate a time domain location for PDCCH monitoring; and
performing the PDCCH monitoring based on the time domain location indicated by the first indication information;
wherein the PDCCH monitoring comprises GC-PDCCH monitoring; and
wherein the GC-PDCCH information further comprises monitoring information of the GC-PDCCH monitoring, and the monitoring information comprises one or a combination of: a monitoring start moment, a monitoring end moment, at least one to-be-monitored slot, and a to-be-monitored symbol location in each slot.

* * * * *